(12) United States Patent
Tse

(10) Patent No.: US 6,640,537 B2
(45) Date of Patent: Nov. 4, 2003

(54) AERO-ENGINE EXHAUST JET NOISE REDUCTION ASSEMBLY

(75) Inventor: Man-Chun Tse, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/737,599

(22) Filed: Dec. 18, 2000

(65) Prior Publication Data

US 2002/0073690 A1 Jun. 20, 2002

(51) Int. Cl.[7] .............................. F02K 1/40; F02K 1/46
(52) U.S. Cl. ...................... 60/262; 60/264; 239/265.19; 239/265.17; 181/220
(58) Field of Search .......................... 60/204, 262, 264; 239/265.19, 265.17, 127.3, 127.1, 265.23; 181/213, 220

(56) References Cited

U.S. PATENT DOCUMENTS

| | | | | |
|---|---|---|---|---|
| 2,926,744 A | * | 3/1960 | Towle et al. ................ | 181/213 |
| 2,948,115 A | * | 8/1960 | Dunsworth et al. .... | 239/265.17 |
| 2,959,917 A | * | 11/1960 | McGehee .................. | 181/213 |
| 2,971,327 A | * | 2/1961 | Moy et al. ............. | 239/265.17 |
| 2,979,151 A | * | 4/1961 | Blackwell et al. .......... | 181/217 |
| 3,153,319 A | * | 10/1964 | Young et al. ............... | 181/215 |
| 3,185,252 A | * | 5/1965 | Lemmerman ............... | 181/217 |
| 3,215,172 A | * | 11/1965 | Ardoin .................. | 239/265.19 |
| 3,568,792 A | * | 3/1971 | Urquhart ............... | 239/265.19 |
| 4,051,671 A | * | 10/1977 | Brewer ........................ | 60/262 |
| 4,077,206 A | * | 3/1978 | Ayyagari .................... | 181/220 |
| 4,215,536 A | * | 8/1980 | Rudolph ..................... | 181/213 |
| 4,244,441 A | * | 1/1981 | Tolman ...................... | 181/213 |
| 4,284,170 A | | 8/1981 | Larson et al. | |
| 4,311,291 A | * | 1/1982 | Gilbertson et al. .... | 239/265.19 |
| 4,786,016 A | | 11/1988 | Presz, Jr. et al. | |
| 4,817,379 A | * | 4/1989 | Bagley ........................ | 60/262 |
| 4,934,481 A | | 6/1990 | Friedrich | |
| 5,717,172 A | | 2/1998 | Griffin, Jr. et al. | |
| 6,012,281 A | | 1/2000 | Hauser | |
| 6,314,721 B1 | * | 11/2001 | Mathews et al. ........... | 181/213 |
| 6,360,528 B1 | * | 3/2002 | Brausch et al. ............... | 60/264 |

* cited by examiner

*Primary Examiner*—Ted Kim
(74) *Attorney, Agent, or Firm*—Pratt & Whitney Canada Corp.

(57) ABSTRACT

A gas turbine engine of a fan bypass type includes an exhaust shroud having a perforated tubular wall extending between a forward end and an aft end. The exhaust shroud is adapted to be affixed to a gas turbine engine exhaust for discharging engine exhaust gases without substantial blockage thereto. The perforations formed in the shroud wall communicate the regions at both sides of the shroud wall to pass fluid flow across the perforated shroud wall so that the mixing of the engine exhaust gases with a surrounding fluid flow is enhanced. The mixing of the engine exhaust gases with the surrounding fluid flow is further enhanced by a trailing edge of the exhaust shroud. The trailing edge is deviated from a straight line in a circumferential direction of the tubular wall to effectively increase the peripheral length of the mixing boundary. Thus, the jet noise contribution volume of the engine exhaust gases is effectively reduced, thereby significantly reducing the aero-engine jet noise. The exhaust shroud for enhancing the mixing of engine exhaust gases with the surrounding fluid flow is applicable to both short and long cowl nacelle gas turbine engines and is simple and economical to manufacture and maintain.

13 Claims, 2 Drawing Sheets

AERO-ENGINE EXHAUST JET NOISE REDUCTION ASSEMBLY

THE FIELD OF THE INVENTION

The present invention relates to the suppression of gas turbine engine noise, and more particularly to aero-engine exhaust jet noise reduction.

BACKGROUND OF THE INVENTION

Noise has been a significant negative factor associated with the commercial airline industry since the introduction of the aircraft gas turbine engine. Considerable effort has been directed toward quieting aircraft engines.

Aero-engine exhaust jet noise is a dominant noise source of aircraft gas turbine engines at high power settings, for example, during a flight take-off operation. Jet noise is not generated within the gas turbine engine, but is caused by turbulence resulting from large velocity gradients produced by viscous shearing of rapidly moving gases exhausted into the relatively quiescent surrounding atmosphere at the boundary between the exhaust gases and the atmosphere. Since the acoustic gas power is exponentially related to the velocity of the exhaust gases, that is, proportional to $V^8$, decreasing the velocity of the exhaust gases prior to discharge into the atmosphere substantially reduces the intensity of the jet noise.

In comparison with the early turbo engines, modern gas turbine engines have reduced the jet noise significantly. Many types of modern gas turbine engines are of the mixed flow variety, wherein a primary fluid stream is mixed with a secondary fluid stream prior to discharge of the exhaust fluid into the atmosphere, as a common thrust-producing mixed flow fluid stream. Generally, the primary fluid stream is the high velocity, high temperature exhaust gases flowing from the turbine stage of the core engine and the secondary fluid stream is air or gas at a lower temperature and velocity, for example, from the engine fan stage through an annular bypass duct surrounding the core engine. As is well known in the art, such a mixed flow has two beneficial effects. First, engine thrust is improved since the mixed gases have a higher mass-velocity product than that of the turbine exhaust gases alone. Secondly, the noise level is reduced since the exhaust mixed gases have a lower velocity than the velocity of the turbine exhaust gases. Arrangements for mixing the core engine exhaust gases with bypass flow are well known in the art. One type of the prior art mixing apparatus, for example, includes a generally tubular mixer section having a plurality of axially extending circumferentially spaced lobes or corrugations of increasing radial dimensions relative to the mixer length. These lobes effectively increase the peripheral length of the mixing boundary formed at the mixer section exit plane to thereby provide more efficient mixing, and hence, lower jet noise. Such mixers are employed within jet engine exhaust nozzles, particularly utilized within a bypass pipe turbofan gas turbine engine. One example of the prior art mixing apparatus is disclosed in U.S. Pat. No. 4,077,206, issued to Ayyagari on Mar. 7, 1978. The gas turbine mixer apparatus described by Ayyagari further includes acoustically absorbent material mounted along the crests of the axially extending mixer lobes and in the inter-lobal regions to reduce the overall engine noise level, including the low frequency core noise and the high frequency fan noise imbedded in the exhaust gases.

Although prior art mixers are effective in reducing the overall jet noise, the prior art mixers generally are used with gas turbine engines having a long cowl nacelle which extends downstream of a core engine exhaust end, so that the mixing action generally occurs within the nacelle duct at the downstream end section. It is not popular to use the prior art mixers with gas turbine engines having a short cowl nacelle because the core engine extends downstream of the nacelle outlet and the air flow discharged from the bypass duct is mixed with unbounded air before reaching the core engine exhaust end.

The viscous shearing of the rapidly moving exhaust gases, even after being mixed with bypass duct air flow by the mixer, discharged into the relative quiescent surrounding unbounded air, still produces a turbulence region immediately downstream of the exhaust end of the gas turbine engine, effectively, about a longitudinal length of up to 20 times the diameter of the exhaust end of the gas turbine engine. This turbulence region produces the substantial portion of exhaust jet noise and is called the jet noise contribution volume. There is always a need for a better mixing of engine exhaust gases to reduce the jet noise contribution volume, thereby resulting in exhaust jet noise reduction.

U.S. Pat. No. 4,786,016, issued to Presz, Jr. et al. on Nov. 22, 1988 discloses a casing surrounding a fluid stream over which an unbounded fluid flows in a downstream direction having a plurality of alternating, adjoining troughs and ridges in its external surface, extending in the downstream direction to a thin trailing edge of the casing, which will thereby have a wave-like shape. According to Presz, Jr. et al. this type of casing structure which can be applied to both long cowl nacelle and short cowl nacelle gas turbine engines and, to both a nacelle outlet and a core engine exhaust nozzle, is used to prevent or reduce the area of streamwise two-dimensional boundary layer separation on the external surface of the casing, and therefore to reduce the surface drag. Presz, Jr. et al. does not disclose any noise reduction effect of the casing structure. Nevertheless, the wave-like shaped casing structure is similar to the prior art mixers and promotes the mixing of the fluid flow discharged from the casing with the surrounding unbounded air. Thus, the wake-like shaped casing structure will reduce exhaust jet noise as well, when formed as an air end section of a gas turbine engine nacelle or the exhaust end of the core engine. U.S. Pat. No. 4,934,481, issued to Freidrich on Jun. 19, 1990 discloses a controllable device for suppressing jet engine noise. According to Freidrich, a plurality of vanes are provided around the cowl of the engine in the region of the exhaust nozzle and are movable between a retracted position in which they are lying close to the cowl, and an extended position in which they are spaced apart from the cowl so that, together with the cowl, the extended vanes define a substantially annular duct. One or more nozzles beneath each vane directs high pressure air into the annular duct in a direction towards the rear of the engine so that the air leaving the duct creates a zone of accelerated and turbulent air surrounding the exhaust gases from the engine and this reduces the noise caused by the engine exhaust. The apparatus includes moving parts which are relatively expensive to manufacture and maintain.

In order to reduce high frequency exhaust jet noise, Larson et al. in U.S. Pat. No. 4,284,170, issued on Aug. 8, 1981 discloses the use of spacing asymmetrical inwardly facing tabs around the periphery of an inner pipe of a fan jet engine having an outer pipe extending beyond the inner pipe to destroy coherence of the unsteady pressure field occasioned, when the co-annular flow streams are discharged from the respective inner and outer pipes to commingle.

It is desirable to develop more effective new and alternative devices for aero-engine exhaust jet noise reduction. It is also desirable to have new and alternative devices for aero-engine exhaust jet noise reduction that are simple to manufacture and maintain, and applicable to different types of gas turbine engines.

SUMMARY OF THE INVENTION

It is one object of the present invention to provide an assembly for effectively suppressing aero-engine exhaust jet noise.

It is another object of the present invention to provide a gas engine exhaust jet noise reduction assembly that is simple to manufacture and maintain.

It is yet another object of the present invention to provide a gas engine exhaust jet noise reduction assembly applicable to gas turbine engines having either a short cowl nacelle or a long cowl nacelle.

It is a further object of the present invention to provide a device to enhance mixing of the engine exhaust gases with surrounding fluid flow.

It is a still further object of the present invention to provide a method of enhancing the mixing of engine exhaust gases with a surrounding fluid flow for reducing a jet noise contribution volume of the engine exhaust gases to suppress gas turbine engine noise.

In general terms, according to the present invention, a gas engine exhaust jet noise reduction assembly is provided for a gas turbine engine having an exhaust end which comprises an exhaust shroud having a tubular wall extending between a forward and an aft end adapted to be affixed to the gas turbine engine exhaust end for discharging engine exhaust gases without substantial blockage thereto; and further comprises perforations formed in the shroud wall for fluid communication between regions at both sides of the shroud wall, thereby resulting in fluid flow across the shroud wall to enhance mixing of the engine exhaust gases with a surrounding fluid air. It is preferable that the aft end of the shroud includes a trailing edge deviated from a straight line in a circumferential direction of the tubular wall, such as a tooth trailing edge. The tooth trailing edge effectively increases the peripheral length of the mixing boundary, and is preferably in an asymmetrical pattern to destroy the coherence of the unsteady pressure field when the engine exhaust gases and the surrounding fluid flow commingle.

In accordance with one embodiment of the present invention, a gas turbine engine of a fan bypass type includes a core engine and a short nacelle surrounding the core engine defining, in combination with the core engine, an annular bypass fluid passage resulting in a bypass fluid flow surrounding core engine exhaust gases, to improve thrust and reduce jet noise. The core engine extends downstream of an outlet of the short nacelle. An exhaust shroud having a perforated tubular wall extending between a forward end and an aft end is affixed to a core engine exhaust nozzle for discharging the engine exhaust gases, without substantial blockage thereto. The perforations through the shroud wall communicate the regions at both sides of the shroud wall to permit fluid flow across the perforated shroud wall under pressure differences between the inside and the outside of the shroud, so that the engine exhaust gases are better mixed with the surrounding fluid flow which is substantially the bypass fluid flow. The bypass fluid flow discharged from the outlet of the annular bypass duct is first mixed with surrounding unbounded air because the nacelle duct is shorter than the core engine. Nevertheless, the longitudinal length from the outlet end of the nacelle to the exhaust nozzle end of the core engine is limited and the diameter of the bypass duct is relatively large so that the bypass fluid flow is not completely mixed with the surrounding unbounded air within the limited distance. Therefore, the fluid flow surrounding the engine exhaust gases is substantially the bypass fluid flow.

In accordance with another embodiment of the present invention a gas turbine engine of a fan bypass type includes a core engine and a long nacelle surrounding the core engine defining, in combination with the core engine, a annular bypass fluid passage so that a bypass fluid flow surrounds a core engine exhaust flow to improve thrust and reduce jet noise. The long nacelle extends downstream of a core engine exhaust end so that the core engine exhaust flow is mixed with the bypass fluid flow within the nacelle duct at the downstream end section, to form the engine exhaust gases to be discharged from the outlet of the nacelle. Similar to the embodiment described above, provided is an exhaust shroud having a perforated tubular wall extending between a forward end and aft end. Nevertheless, instead of being affixed to the core engine exhaust nozzle, this exhaust shroud is affixed to an outlet of the nacelle to enhance the mixing of the engine exhaust gases that include a mixture of the core engine exhaust fluid and the bypass fluid flow, with surrounding unbounded air.

In accordance with another aspect of the present invention a method for suppressing gas turbine engine exhaust jet noise is provided, which comprises: providing a perforated tubular structure adapted to be affixed to an exhaust end of the gas turbine engine to discharge engine exhaust gases axially through the tubular structure without substantial blockage thereto, thereby creating pressure differences between regions inside and outside of the perforated tubular structure and causing radial fluid flow across the perforated tubular structure through the perforations, resulting in enhanced mixing of the engine exhaust gases with a surrounding fluid flow to reduce a jet noise contribution volume of the engine exhaust gases.

The mixing of the engine exhaust gases with the surrounding fluid flow is preferably further enhanced by a trailing edge of the tubular structure. The trailing edge is deviated from a straight line in a circumferential direction of the tubular structure.

The gas engine exhaust jet noise reduction assembly according to the present invention effectively enhances the mixing of the engine exhaust gases with surrounding fluid flow and therefore reduces the jet noise contribution volume of the engine exhaust gases, which directly results in aero-engine exhaust jet noise reduction. The assembly does not include any moving parts and is very simple and economical to manufacture and maintain.

Other advantages and features of the present invention will be better understood with reference to the preferred embodiments described below.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1:
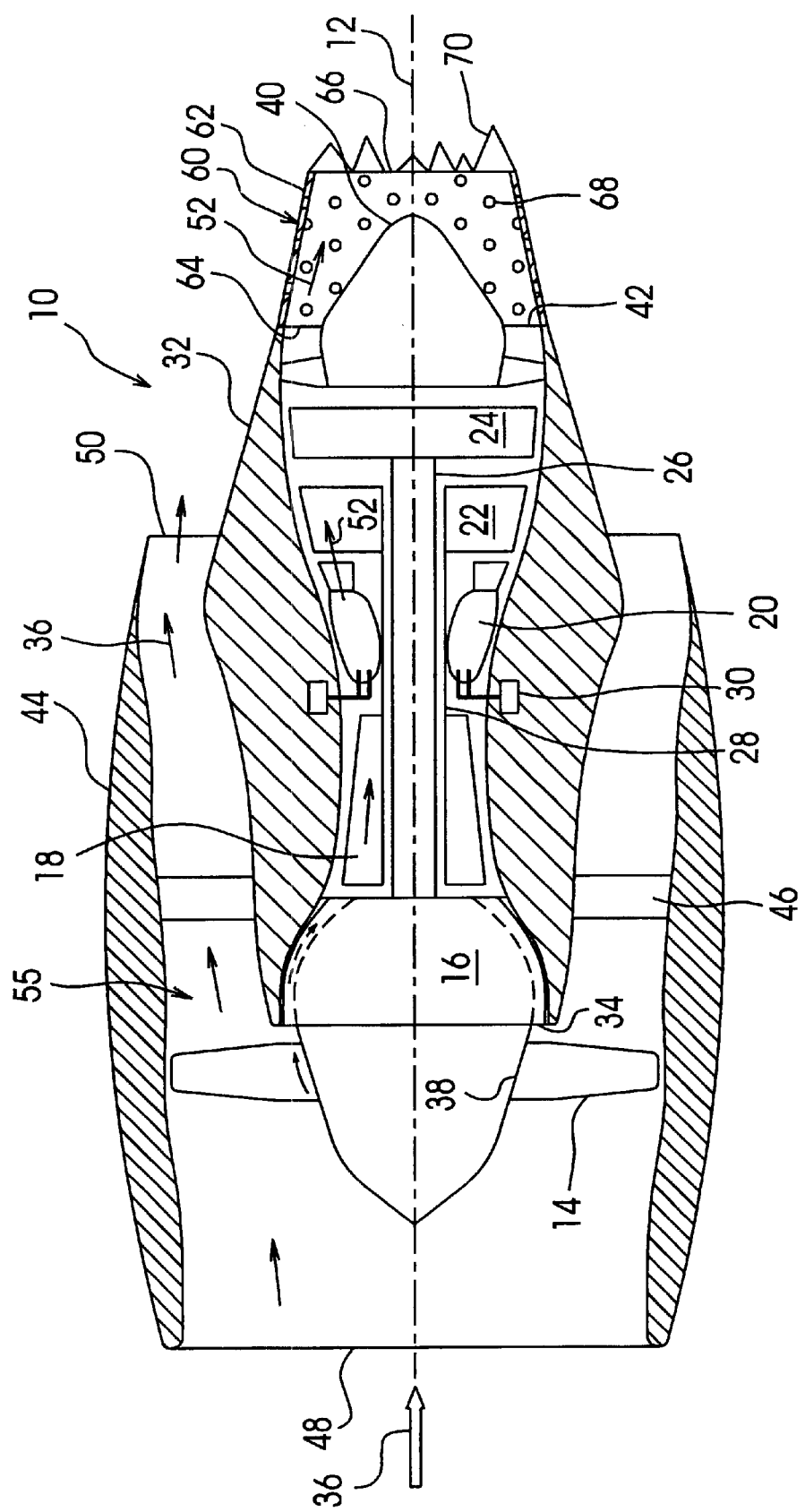
FIG. 1 is longitudinal cross-sectional schematic view of a gas turbine engine having a short cowl nacelle, incorporating one embodiment of the present invention.

Referring to the drawings, particularly FIG. 1, an exemplary gas turbine engine 10 includes in serial flow communication about a longitudinal center axis 12, a fan having a plurality of circumferentially spaced apart fan, or rotor blades 14, a conventional low pressure compressor 16, a conventional high pressure compressor 18, a conventional annular combustor 20, a conventional high pressure turbine 22 and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injecting means 30 are provided for selectively injecting fuel into the combustor 20 for powering the engine 10.

A conventional annular casing 32 surrounds the engine 10 from the low pressure compressor 16 to the low pressure turbine 24, and defines, with the low pressure compressor 16, a low pressure compressor inlet 34 for receiving a portion of ambient air 36 thereof. The downstream end of the casing 32 defines with a conventional annular exhaust plug 40 an annular exhaust outlet 42. A portion of the air 36 compressed by the fan blades 14 adjacent to the blade roots 38 is further compressed by the low pressure compressor 16 and the high pressure compressor 18 and forced into the combustor 20. The mixture of the compressed air 36 and fuel injected by the fuel injecting means 30 generate combustion gases 52. The combustion gases 52 cause the high pressure turbine 22 and the low pressure turbine 24 to rotate respectively for powering the high pressure compressor 18, the low pressure compressor 16 and the fan blades 14. Surrounding the blades 14 and the upstream portion of the casing 32 is a short cowl nacelle 44 which is spaced radially outwardly from the casing 32 to define with the casing 32 an annular duct 55 for permitting the radially outer portion of the air 36 compressed by the fan blades 14 to bypass the engine 10. A plurality of circumferentially spaced stator vanes 46 extend radially between the casing 32 and the nacelle 44, and are spaced apart axially downstream of the fan blades 14. The nacelle 44 includes an inlet 48 at its upstream end for receiving the ambient air 36 and an outlet 50 for discharging the portion of the air 36 which is compressed by the fan blades 14 and passed over the stator vanes 46, for providing a portion of a thrust.

The air flow discharged from the outlet 50 of the bypass duct 55 is adapted to mix with the combustion gases 55 discharged from the exhaust outlet 42 of the engine 10 to form the jet exhaust. This will achieve a higher mass-velocity product than the combustion gases 52 alone to improve the engine thrust, and a lower velocity than the velocity of the combustion gases 52 to reduce the jet exhaust noise level.

In order to enhance the mixing of the air flow discharged from the outlet 50 of the bypass duct 55 with the combustion gases 52 discharged from the exhaust outlet 42 of the engine, an exhaust shroud 60 is affixed to the exhaust outlet 42 of the engine 10. The exhaust shroud 60 generally includes a tubular wall 62 extending between a forward end 64 which is seamlessly connected to the exhaust outlet 42 of the engine 10, and an aft end 66 which extends downstream of the engine to form a most distal end thereof (see FIG. 1). The tubular wall 62 may be in a cylindrical shape or constructed in a truncated cone shape (a convergent shape) as shown in FIG. 1 depending on the axial contour of the casing 32. The axial contour of the tubular wall 62 is preferably formed as a smooth extension of the casing 32, thereby discharging the combustion gases 52 through the exhaust shroud 60 without substantial blockage thereto. The perforations 68 are formed in the tubular wall 62, preferably in a staggered pattern. The exhaust shroud 60 further includes a tooth trailing edge 70 formed on the aft end 66 of the tubular wall 62. The tooth trailing edge 70 forms an irregular trailing edge with a plurality of tooth-like elements in different shapes and sizes, unevenly distributed around the circumference of the aft end 66 of the tubular wall 62. All of the tooth-like members generally extend rearwardly from the aft end 66 of the tubular wall 62.

In operation, the compressed air 36 discharged from the outlet 50 of the bypass duct 55 is mixed with surrounding unbounded air before reaching the exhaust outlet 42 of the engine 10. However, the longitudinal distance from the outlet 50 of the bypass duct 55 to the exhaust outlet 42 of the engine is limited and the diameter of the bypass duct 55 is relatively large, so that only a small outer portion of the annular bypass air flow 36 is mixed with the surrounding unbounded air. The major inner portion of the annular bypass air flow 36 remains unmixed when it reaches the region between the exhaust outlet 42 of the engine 10 and the aft end 66 of the exhaust shroud 60. The tubular wall 62 of the exhaust shroud 60 prevents the combustion gases 52, discharged from the exhaust outlet 42 of the engine, from directly contacting the surrounding bypass air flow 36 so that the viscous shearing of the two fluid flow layers occurring at the boundary thereof is avoided. Nevertheless, it is noted that the combustion gases 52 discharged from the outlet 42 of the engine 10 and the bypass air flow 36 discharged from the outlet 50 of the bypass duct 55, have different velocities, temperatures and pressures. The pressure difference inside and outside of the tubular wall 62 of the exhaust shroud 60 cause fluid to flow radially across the tubular wall 62 through the perforations 68, which enhances the mixing of the combustion gases 52 discharged from the outlet 42 of the engine 10 with the bypass air flow 36 discharged from the outlet 50 of the bypass duct 55.

In addition to the exhaust jet noise, several other noise components produced by the engine are generally embedded in the combustion gases 52 discharged from the exhaust outlet 42 of the engine. One such noise component, due to acoustic energy contained within the high temperature, high velocity turbine exhaust gases 52, is commonly called core noise. Core noise includes contributions from the combustion of the jet fuel within the engine combustor stage and contributions due to the interaction of the unstable combustor gases with the downstream turbine blades. This embedded noise in the combustion gases 52 discharged from the exhaust outlet 42 of the engine 10 will be partially attenuated by the perforated tubular wall 62 of the exhaust shroud 60.

Furthermore, the mixing of the combustion gases 52 discharged from the outlet 42 of the engine and the bypass air flow 36 discharged from the outlet 50 of the bypass duct 55, is further enhanced by the tooth trailing edge 70. In comparison with a standard circular trailing edge of a tubular duct, the tooth trailing edge 70 effectively increases the peripheral length of the mixing boundary, thereby resulting in better mixing of the two fluid streams to be mixed. For an overall effect, the exhaust shroud 60 enhances the mixing of the combustion gases 52 and the bypass air flow 36 to effectively reduce the downstream jet noise contribution volume of the engine exhaust gases, resulting in reduction of aero-engine exhaust jet noise.

Figure 2:
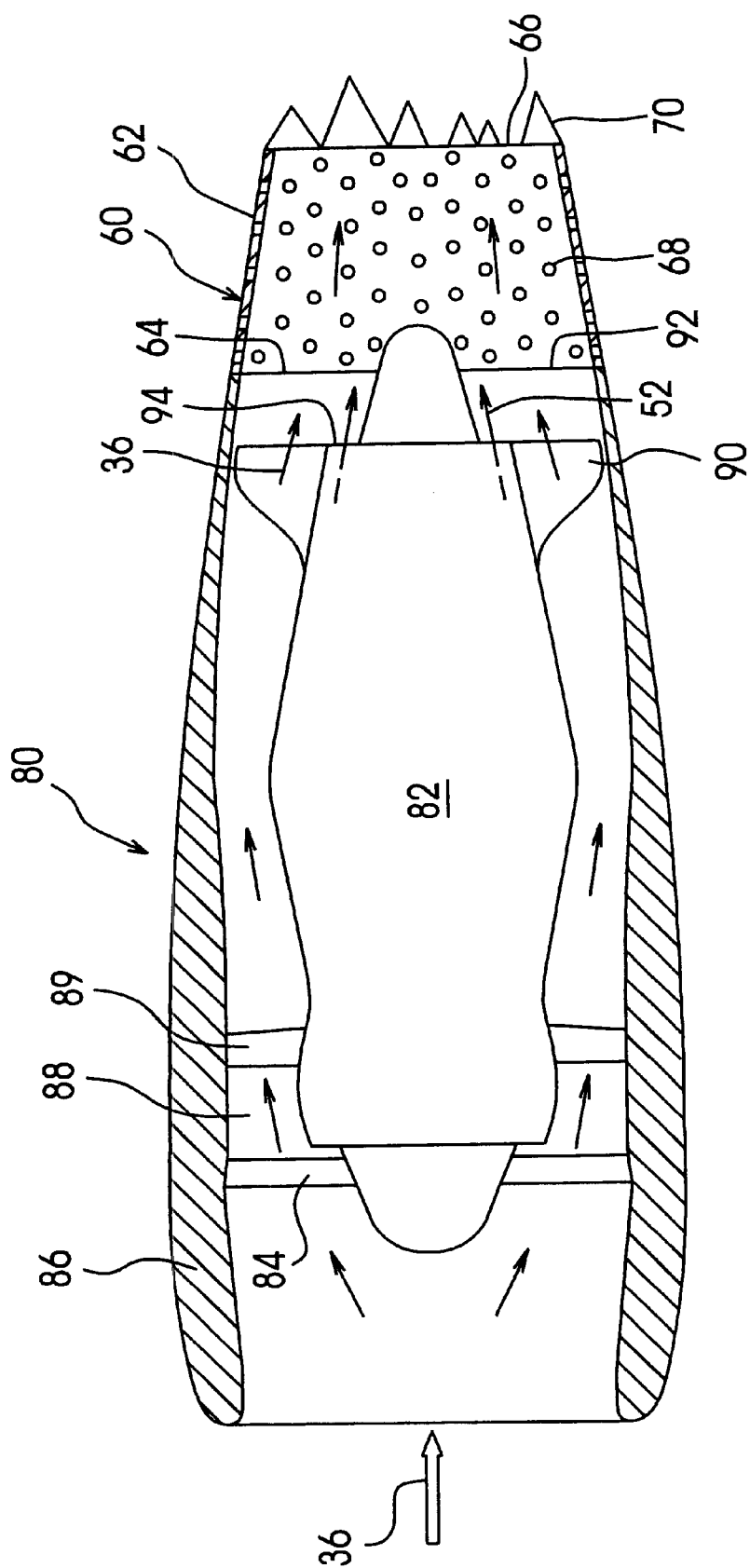
FIG. 2 is a longitudinal cross-sectional schematic view of a gas turbine engine having a long cowl nacelle, incorporating another embodiment of the present invention.

The present invention is also applicable to a long cowl nacelle of a gas turbine engine which is illustrated schematically, in a plan view, partially in section in FIG. 2. An exemplary gas turbine engine 80 is a long cowl mixed flow exhaust fan engine including a centrally disposed core engine 82. The core engine 82 is coupled to drive a plurality of fan blades 84 disposed upstream of the core engine 82. The fan blades 84 and the core engine 82 are disposed inside a nacelle structure 86 which together with the core engine 82 forms an annular bypass duct 88 for directing a predetermined portion of the air flow 36 from the fan blades 84 over a plurality of stator vanes 89 and a mixer device 90 toward the exhaust nozzle 92 for producing the thrust in a manner well known in the art.

The core engine 82 has similar structures and works in a similar way with respect to engine 10 illustrated in FIG. 1, and is not redundantly described. The combustion gases 52 discharged from an exhaust outlet 94 of the core engine 82 are mixed with the surrounding bypass air flow 36 to form the engine exhaust gases before being discharged from the exhaust nozzle 92. The mixer 90 enhances the mixing of the combustion gases 52 and the bypass air flow 36 within the nacelle structure 86 at the downstream end to improve the thrust provided by the engine exhaust gases and reduce the gas jet noise level.

According to another embodiment of the present invention the exhaust shroud 60 is affixed to the exhaust end of the gas turbine engine 80 by seamlessly connecting the forward end 64 of the perforated tubular wall 62 and the exhaust nozzle 92 of the nacelle structure 86. The structural details of the exhaust shroud 60 are similar to those illustrated in FIG. 1 and indicated by the same numerals which are not redundantly described.

The exhaust shroud 60 enhances the mixing of the engine exhaust gases discharged from the exhaust nozzle 92 which include the mixture of the combustion gases 52 and the bypass air flow 36, with surrounding unbounded air, in a manner well described with reference to FIG. 1 so that the jet noise contribution volume of the engine exhaust gases is effectively reduced, thereby resulting in reduction of aero-engine exhaust jet noise.

Modifications and improvements to the above described embodiments of the present invention may become apparent to those skilled in the art. The foregoing description is intended to be exemplary rather than limiting. The scope of the present invention is therefore, intended to be limited solely by the scope of the appended claims.

What is claimed is:

1. A gas turbine engine comprising:
   a turbine portion;
   a combustor portion;
   a compressor portion driven by the turbine portion; and
   a noise reducing apparatus mounted to the engine at an exit end of the engine, the apparatus including an annular wall extending from a first open end to a second open end, the wall communicating directly with the exit end to thereby conduct engine exhaust gases therethrough, the wall having a plurality of perforations therethrough in a staggered offset pattern, the plurality of perforations disposed substantially over the entire surface of the annular wall, the annular wall being open to the atmosphere and free of obstruction radially outwardly thereof, the second open end of the annular wall having a trailing edge deviated from a straight line in a circumferential direction of the annular wall when being viewed in a longitudinal cross-section of the annular wall.

2. The gas turbine engine of claim 1, wherein the annular wall is generally cylindrical in shape.

3. The gas turbine engine of claim 1, wherein the annular wall is generally conical in shape.

4. The gas turbine engine of claim 1, wherein the perforations are unobstructed.

5. The gas turbine engine of claim 4, wherein the annular wall comprises a toothed trailing edge including a plurality of generally rearwardly extending asymmetric tooth pattern.

6. The gas turbine engine of claim 1, wherein the perforations are discrete holes in the smooth annular wall.

7. The gas turbine engine of claim 1, wherein the noise reducing apparatus is mounted to the exit end in substantially seamless connection such that the noise reducing apparatus effectively acts in part as an uninterrupted extension of the gas turbine engine.

8. A gas turbine engine comprising:
   a turbine portion;
   a combustor portion;
   a compressor portion;
   a bypass duct;
   an exhaust exit nozzle wherein an airflow through the gas turbine engine exits the engine; and
   a noise reducing apparatus mounted to the exhaust exit nozzle, the apparatus including an annular wall extending from a first open end to a second open end, the wall having a plurality of perforations therethrough, wherein the wall communicates directly with the exit end to thereby conduct engine exhaust gases therethrough, and wherein the wall is exposed along its entire length to a radially unbounded airflow radially outside of the wall, and wherein the plurality of perforations are disposed axially along the annular wall in a staggered offset pattern, and wherein the second open end of the annular wall has a trailing edge deviated from a straight line in a circumferential direction of the annular wall when being viewed in a longitudinal cross-section of the annular wall.

9. The gas turbine engine of claim 8 wherein a portion of the plurality of perforations are disposed immediately adjacent the to first end.

10. The gas turbine engine of claim 8 wherein the plurality of perforations are disposed substantially over the entire surface of the annular wall.

11. The gas turbine engine of claim 8 wherein the plurality of perforations all have substantially a same diameter.

12. The gas turbine engine of claim 8 wherein the second end is not larger in diameter than the first end.

13. The gas turbine engine of claim 8 wherein the annular wall is smooth.

* * * * *